Aug. 29, 1933.  W. A. AUSTIN  1,925,026
WATER TUBE LOCOMOTIVE BOILER
Filed Dec. 10, 1931   7 Sheets-Sheet 1

Inventor:
William A Austin
by his Attorneys
Howson & Howson

Aug. 29, 1933.   W. A. AUSTIN   1,925,026
WATER TUBE LOCOMOTIVE BOILER
Filed Dec. 10, 1931   7 Sheets-Sheet 2

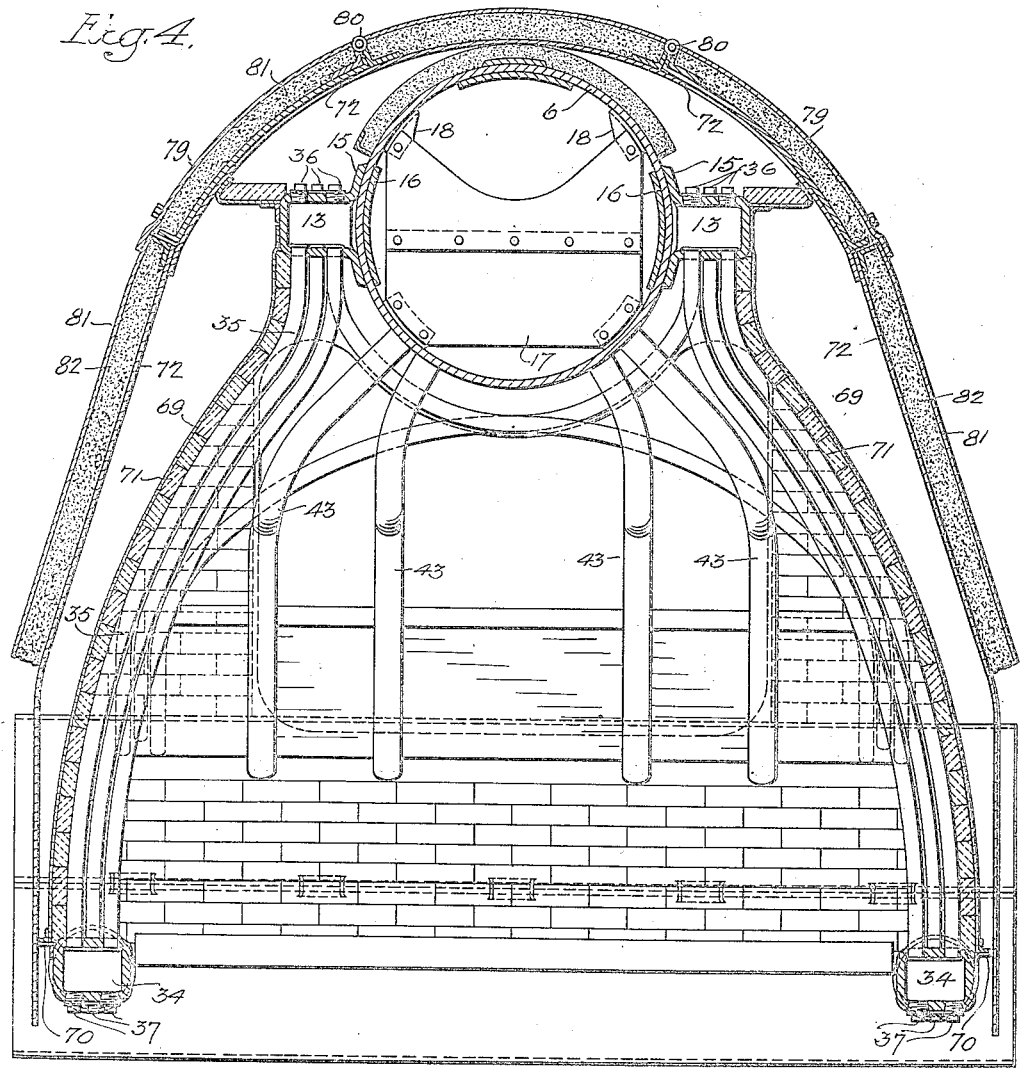

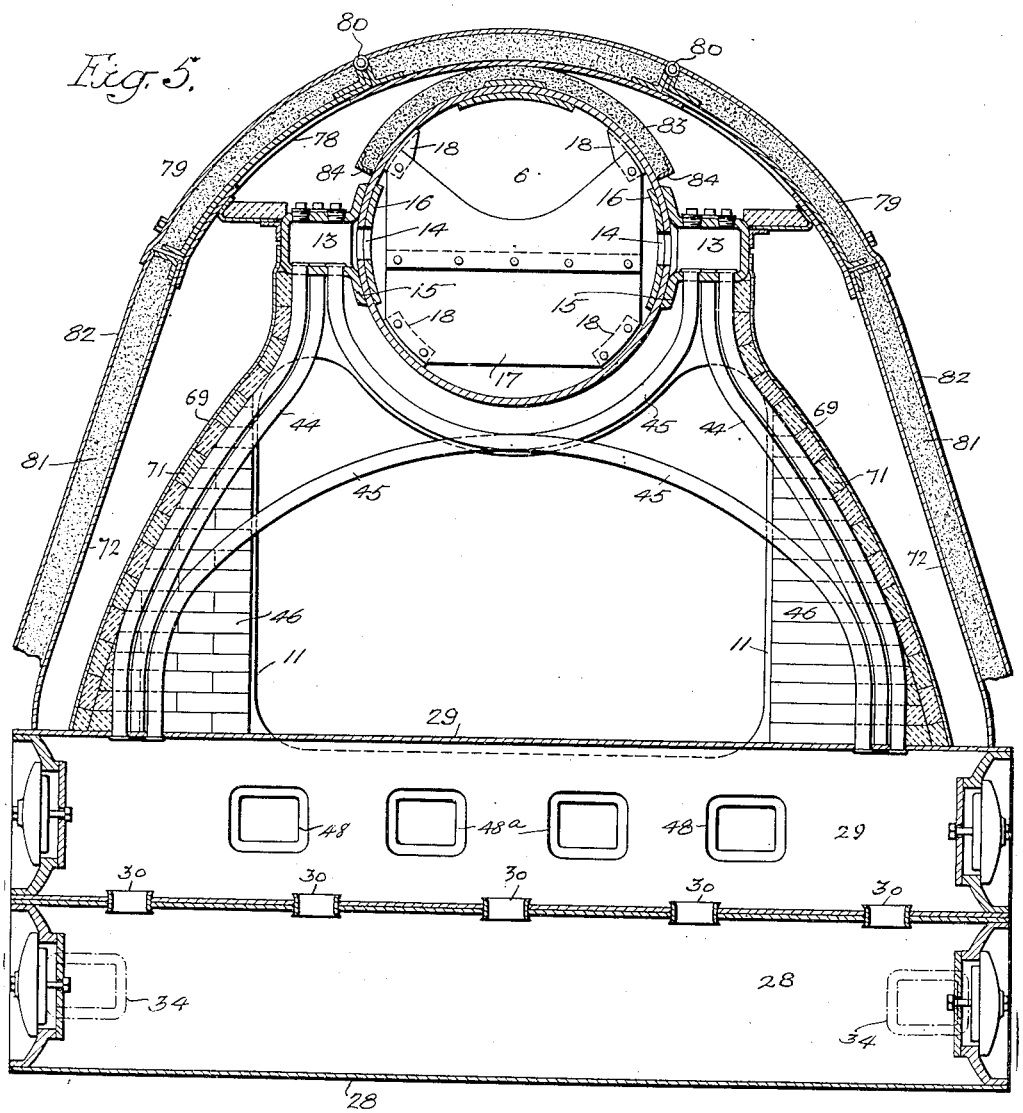

Aug. 29, 1933. W. A. AUSTIN 1,925,026
WATER TUBE LOCOMOTIVE BOILER
Filed Dec. 10, 1931 7 Sheets-Sheet 7
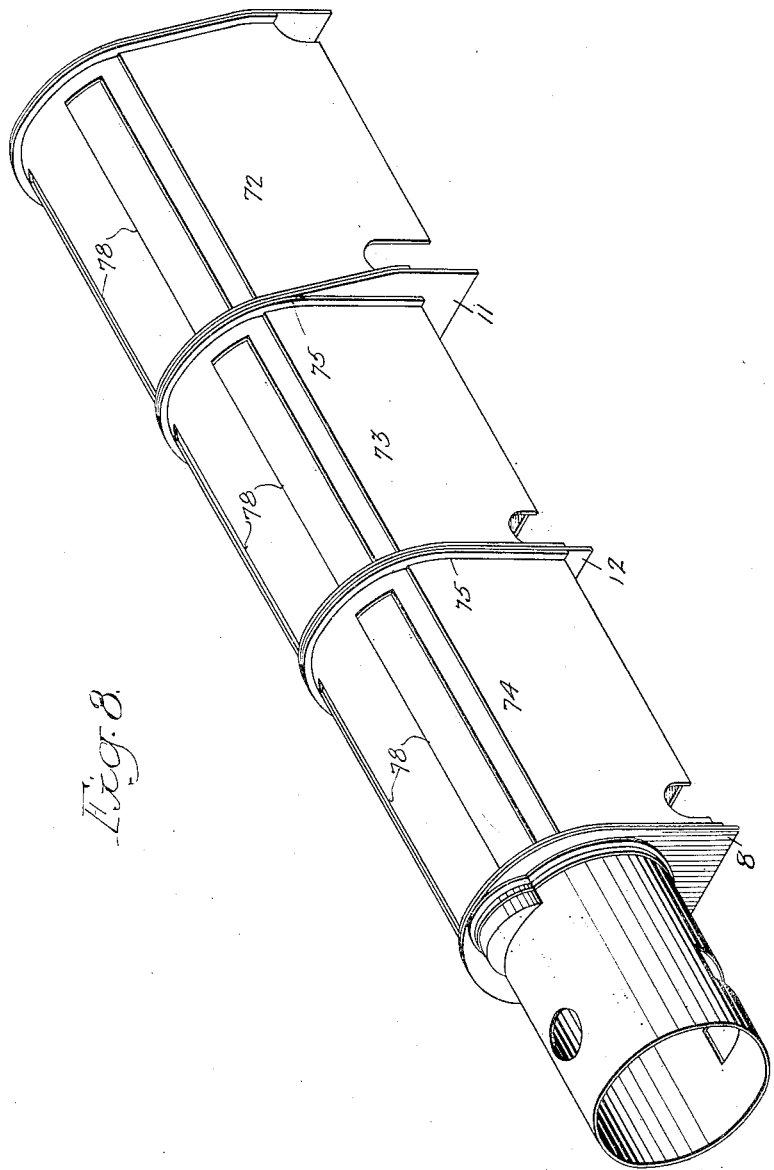

Patented Aug. 29, 1933

1,925,026

UNITED STATES PATENT OFFICE 1,925,026

WATER TUBE LOCOMOTIVE BOILER

William A. Austin, Wynnewood, Pa.

Application December 10, 1931
Serial No. 580,161

14 Claims. (Cl. 122—235)

My invention relates to certain improvements in locomotive boilers of the water tube type.

One object of the invention is to so construct the water tube locomotive boiler that it will resemble the ordinary fire tube locomotive boiler, so that boilers of this type can be mounted on the standard locomotive frames and coupled to the standard appliances which are carried by the frame.

A further object of the invention is to dispense entirely with stay bolts in the construction of a locomotive boiler.

A still further object of the invention is to enclose the water tube structure of the boiler in a casing resembling the standard contour of a locomotive boiler, so that the ordinary type of locomotive appliances can be assembled without serious modification of their conventional forms.

A still further object of the invention is to so construct the boiler that the maximum evaporative surface by means of water tubes can be provided and arranged within an outer casing, so that the tubes will be protected from shock and jarring, at the same time allowing for all usual expansion strains.

Another object of the invention is to so construct the boiler that the tubes are connected at their upper ends to a longitudinal drum and at their lower ends to manifolds and cross-drums, the cross-drums being principally below the level of the active circulation.

These objects I attain in the following manner, reference being had to the drawings, in which:

Fig. 3 is a sectional view on the line 3—3, Fig. 1a;

Fig. 4 is a sectional view on the line 4—4, Fig. 1a;

Fig. 5 is a sectional view on the line 5—5, Fig. 1a;

Fig. 8 is a perspective view of a casing of the boiler; and

Figure 1:
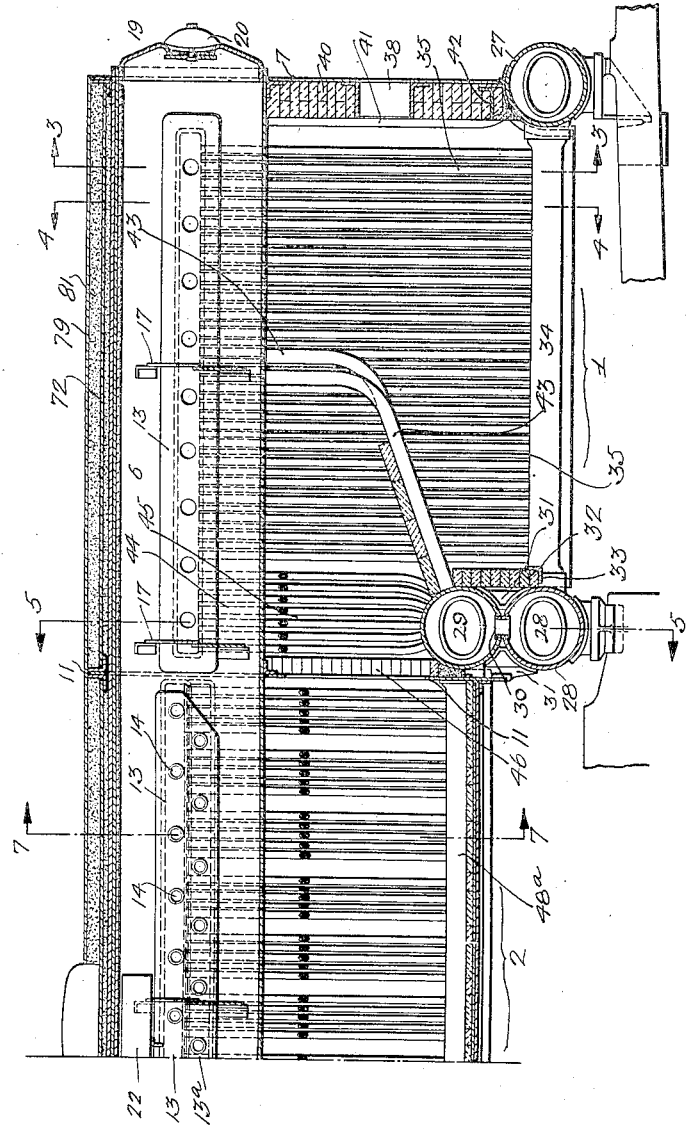
Fig. 1a is a longitudinal sectional view of the rear portion of my improved water tube locomotive boiler.
Fig. 1b is a longitudinal sectional view of the forward end of the locomotive boiler.
Figure 2:
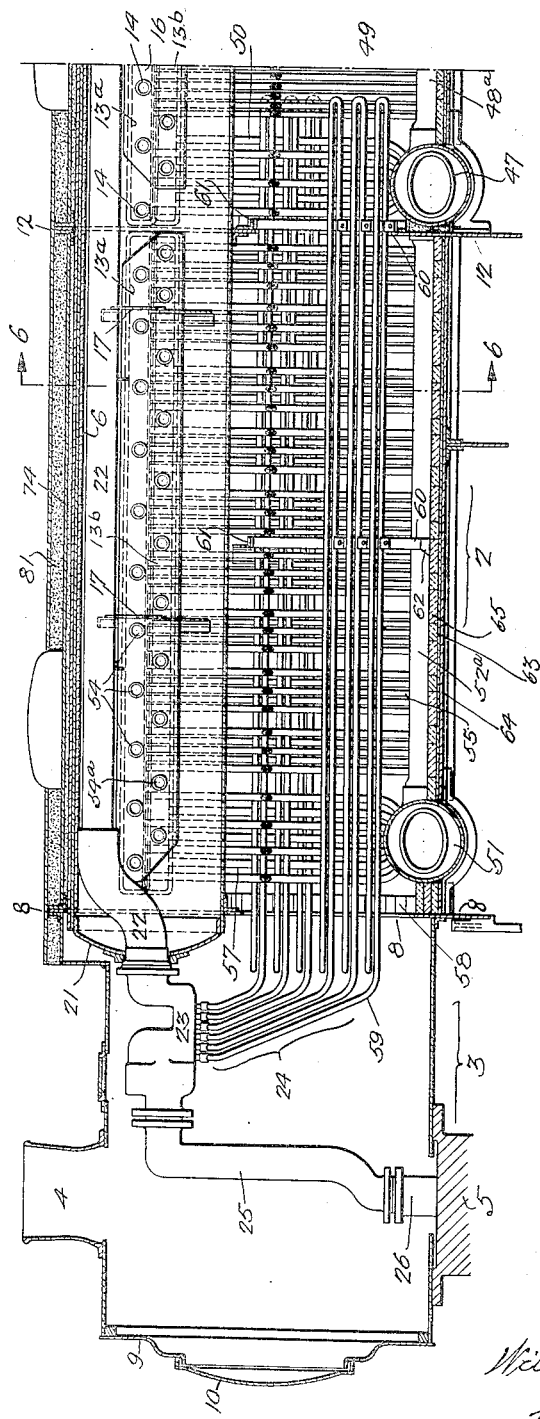

A typical locomotive boiler now in common use has a cylindrical body disposed horizontally and containing horizontal fire tubes joined at the rear end to a water frame with its flat surfaces stayed against pressure by means of screw stay bolts. Heads and tube plates are also stayed by tie-rods attached to the body plates. Under comparatively low pressures this arrangement gives satisfactory service and presents in addition a very rigid construction suitable for resisting the shock and jarring strains occasioned by the passage of the locomotive at various speeds over the irregularities of the track. With the increase of working pressures the fire box stay troubles increase in proportion.

Modern high pressure locomotive boilers of the standard type require intricate staying and very rigid inspection during service, and furthermore high pressures have increased precipitation of solids from the feed water and scaling is consequently more rapid. It is generally admitted that the water tube principle would be a betterment in locomotive boiler design but it is much more difficult to adapt this type to the constructive and service limitations encountered in railway service. Any water tube boiler for locomotive use must combine rigidity of external construction with the necessary flexibility of details which are subject to expansion.

By my invention the objection to the water tube type of boiler for use in locomotives has been overcome. My improved boiler retains the same general contour of the ordinary flue type of boiler so that it can be applied to the standard framework now in use and can be readily coupled to the standard fixtures now considered practical in locomotive construction.

Referring to the drawings, 1 is the fire box section of the boiler and 2 is the horizontal barrel section similar in outline to the ordinary barrel in which the fire tubes are located. At the forward end of the boiler is the smoke-box section 3, having a stack 4 and supported on the cylinder structure 5, which may be of any of the ordinary types.

Extending throughout the length of the main portion of the boiler is a drum 6, which is supported at its rear end on the rear wall 7 of the fire box, and at its forward end on a sheet 8, which forms the rear wall of the smoke-box section 3, the front end of this smoke-box section being closed by the usual head 9, having a movable door 10 so that access may be had to the interior of the smoke-box section. The drum is supported at points between its ends by a sheet 11, which forms the front wall of the fire box, and by an intermediate sheet 12. The number of supporting sheets may be increased or decreased, depending upon the length of the boiler.

At each side of the drum 6 are three sets of longitudinal manifolds. The manifolds 13 at the fire box end of the drum, in the present instance, communicate with the interior of the drum through openings 14. These manifolds are flanged at 15 and reinforcing plates 16 are located within the drum to reinforce the joint between the manifolds and the drum, and the plates are perforated in line with the openings 14 of the drum, so as to allow for free circulation from the manifolds into the drum.

Figure 6:
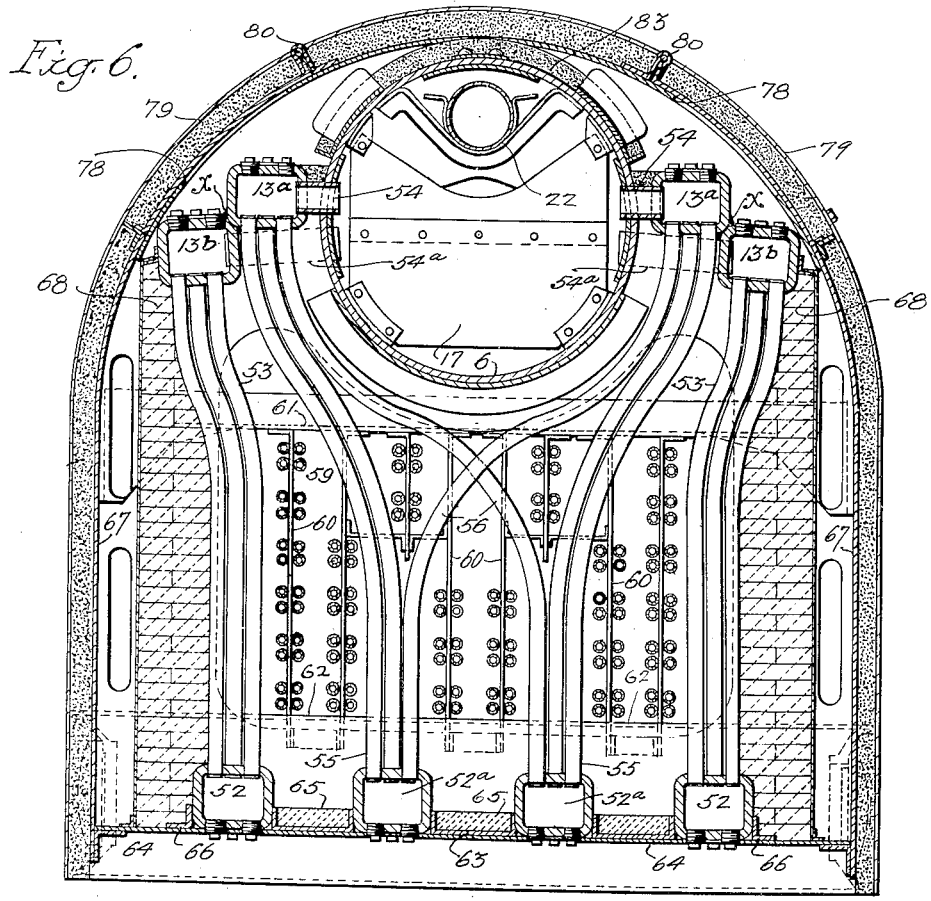
Fig. 6 is a sectional view on the line 6—6, Fig. 1b.

In the drum are a series of surge plates 17, which are secured to angular brackets 18 firmly welded or otherwise secured to the interior walls of the drum. These plates prevent the surging of the water in the drum. The rear head 19 of the drum is welded or otherwise secured to the rear end of the drum, which projects through the rear wall plate 7 and has a man-hole opening 20 closed by the usual man-hole cover. The forward end of the drum has a head 21, through which extends the live steam pipe 22. That portion of the pipe 22 within the drum is suitably supported in the upper portion of the drum, as shown in Fig. 6, and terminates at a point about midway of the length of the drum.

The forward end of the live steam pipe, which extends beyond the forward head 21 of the drum, is connected to a header 23 in the present instance, of the superheater 24. The header 23 of the superheater in turn is connected to a pipe 25, which is coupled to the pipe 26 leading to the valve chambers in the cylinder structure 5, not shown. Any suitable cylinder structure may be used as the cylinder structure forms no part of the present invention.

At the lower portion of the boiler are transverse drums connected by longitudinal manifolds. At the rear end of the fire-box section 1 is a drum 27, which supports the back plate 7 of the rear wall structure of the fire box, and at the forward end of the fire box structure are two drums 28 and 29. The drum 29 is located directly above the drum 28 and is coupled thereto by nipples 30 to allow water to freely circulate through both drums.

At each side of the drum strucure are reinforcing castings 31, which are shaped to partially encircle both drums, giving rigidity to the structure, and the one at the fire box acting to support the fire brick wall 32 at the forward end of the fire box. This wall rests upon an angle bar 33, which extends from one side to the other of the boiler structure.

At each side of the fire box are longitudinal headers 34, which are coupled to the rear drum 27 and the forward drum 28 of the fire-box section, and a series of vertical tubes 35—35a are secured to the upper walls of the manifold 34 and are attached to the lower walls of the manifolds 13 of the drum 6. In some instances the tubes 35a at the fire box may cross each other alternately in the same manner as the tubes 45 in the barrel of the fire box, without departing from the essential features of the invention.

Figure 3:
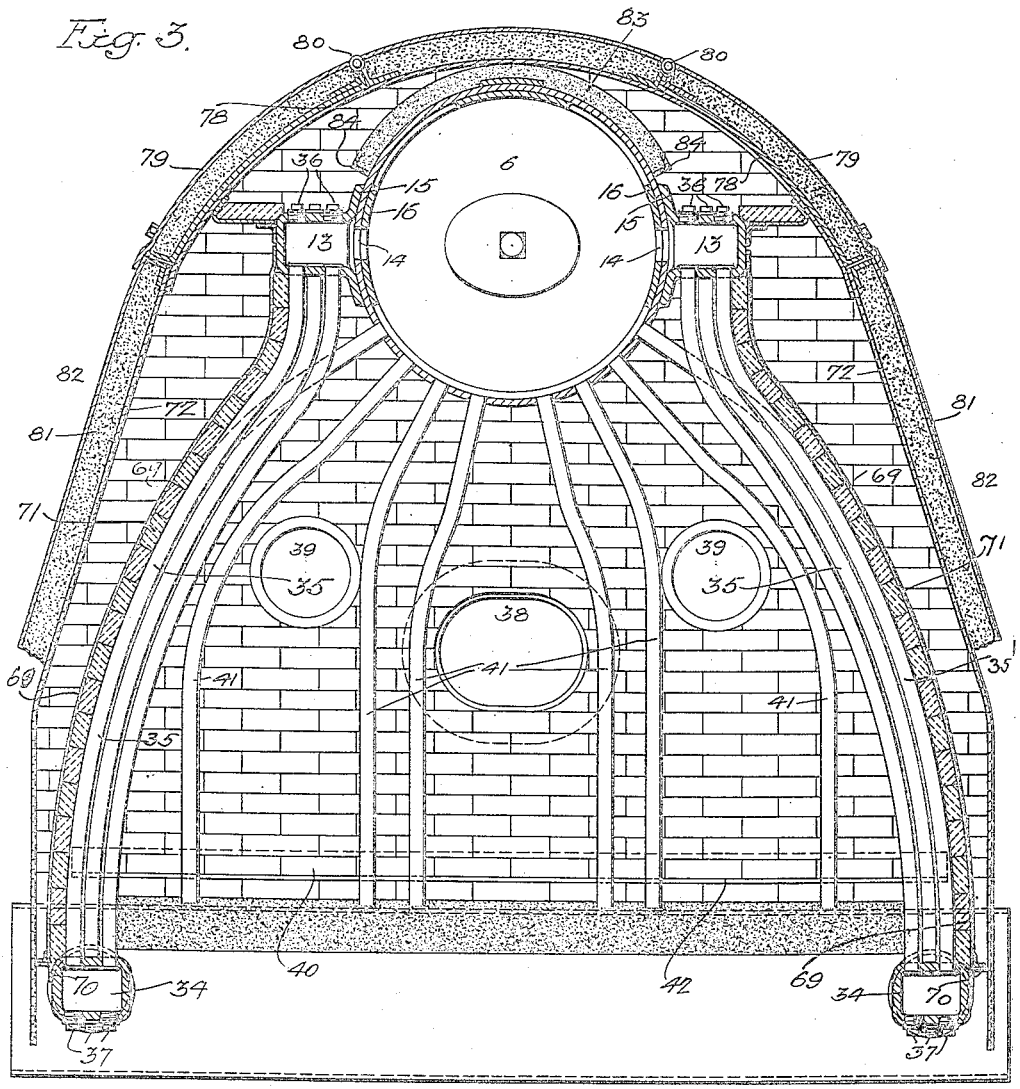

It will be noticed in Fig. 3 that these tubes are curved inwardly and are bent at their upper ends so as to be at right angles to the lower walls of the manifolds 13, so that the expanding of the tubes in the openings in the manifolds can be readily made and an accurate fit assured.

In the upper manifold 13 are a series of openings closed by plugs 36, and in the lower manifolds 34 are openings closed by plugs 37. These openings are in alignment with the tubes so as to allow the tubes to be readily expanded in the manifolds and also to allow for the ready cleansing of the tubes.

In the rear wall 7 of the boiler is an opening 38 closed by a fire door, not shown, and additional openings 39 are provided for application of mechanical stokers, not shown, and within the fire box structure at the rear wall is the usual fire brick lining 40, and as shown in Fig. 3, there are a series of vertical tubes 41, which are connected directly with the lower portion of the drum 6 and with the lower transverse drum 27. These pipes are curved at their lower ends to meet the drum 27 perpendicularly, as clearly shown in Fig. 1a. These pipes 41 are so located and bent as to clear the fire door openings 38 and the openings 39, as shown in Fig. 3. Extending from the upper drum 29 at the forward end of the fire box to a point near the rear end of the fire box are inclined tubes 43, which are bent upwards at their rear ends, and are connected with the drum 6 as clearly shown in Fig. 1a and Fig. 4.

Referring to Figs. 1a and 5, 44 are a series of tubes connecting the upper drum 29 with the upper manifold 13, as clearly shown in Fig. 5, and also a series of tubes 45, which communicate with the drum 29 near each side, and are curved under the drum 6 and are connected with the manifold 13 on the opposite side of the drum 6. These tubes are alternately arranged.

The supporting sheet 11, which is directly in front of the tubes 44 and 45, is open between the drum 6 and the drum 29, so as to allow the products of combustion to pass into the barrel of the boiler, the walls at each side of the opening being lined with fire brick 46, Fig. 5.

In the barrel 2 of the boiler is a drum 47. In the fire-box section of the boiler are single manifolds 13, which are located on each side of the drum 6 and communicate therewith. In the barrel of the boiler there are two sets 13a—13b, Figs. 6 and 7. These manifolds in the present instance are welded together as shown at x, to form what I term duplex manifolds.

The duplex manifolds are located as shown in Fig. 6, their upper members 13a being connected to the drum 6 by nipples 54, and lower members 13b, which are slightly below the manifolds 13a, are connected by extended nipples 54a. These latter members 13b are located slightly on the outer side of each member 13a, the two members 13a and 13b comprising a complete duplex manifold with welded or caulked joints between the members.

Figure 7:
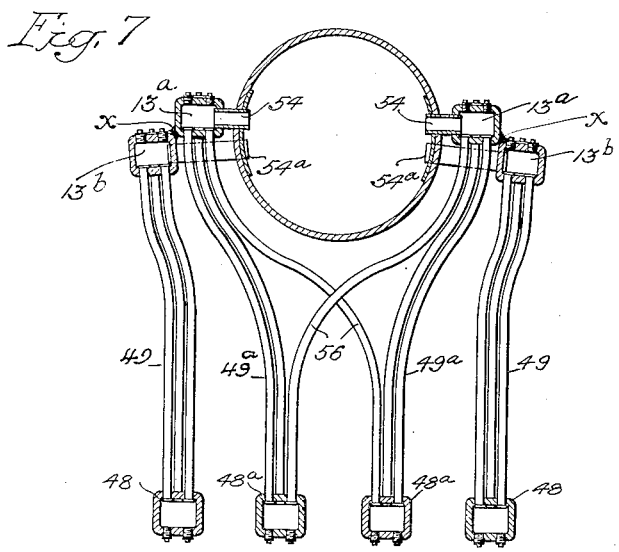
Fig. 7 is a sectional view on the line 7—7, Fig. 1a, on a reduced scale.

Located in a horizontal line, in the present instance, with the transverse drums 29 and 47, and connecting these drums, are longitudinal manifolds 48, 48a, Fig. 7, and a series of vertical tubes 49 connect manifolds 48 at each side of the barrel of the boiler with the manifolds 13b on that side of the boiler.

Communicating with the drum 47 are a series of tubes 50. These tubes extend to the manifolds 13a, 13b of the drum 6. Some of these tubes are connected directly with the manifolds 13a, 13b on the same side as the drum 6, while others extend under the drum 6 to the opposite manifold 13a, similar to the tubes 44 and 45, Fig. 5.

Connecting the transverse drum 47 with a drum 51 are four longitudinal manifolds 52, 52a, arranged as shown in Fig. 6. 53 is a series of tubes at each side of the barrel, connecting directly with the lower manifolds 52 and the upper manifolds 13b. The lower manifolds 52a are located on each side of the center line of the boiler and vertical tubes 55 extend to the manifolds 13a on the same side of the center line of the boiler, while tubes 56 connect the manifold on one side of the center line of the boiler with the manifolds 13a on the opposite side of the center line of the boiler, and these alternately cross under the drum 6. The upper portions of the tubes are curved as shown.

While tubes 49a connect the manifolds 48a, which are on each side of the center line of the boiler, with the manifolds 13a, the cross tubes 56 connect the manifolds 48a on one side of the center line of the boiler with the manifolds 13a on the opposite side of the boiler, as clearly shown in Fig. 7.

Connecting the transverse drum 51 to the manifolds 13a, 13b are curved vertical tubes 57 arranged in the same manner as the tube 50, which connect the drum 47 with the manifolds 13a, 13b. The plate 8 which forms the rear wall of the smoke-box section has an enlarged opening therein for the passage of the products of combustion and is lined on the inside with fire-brick 58.

If a superheater is used in connection with the boiler as shown in Fig. 1b, the pipes 59 of the superheater 24, which are coupled to the superheater manifold 23, extend longitudinally into the boiler as shown in Fig. 1b. These superheater tubes are supported on frames 60 within the boiler as shown in Fig. 1b and Fig. 6. These frames are secured to upper transverse bars 61 and lower transverse bars 62. The construction of the frames may be modified without departing from the essential features of the invention. The frames are so arranged that the superheater tubes are supported clear of the main tubes of the boiler. Between the longitudinal manifolds 48, 48a and 52, 52a, are angle plates 63, which support the bottom plate 64 of the barrel of the boiler, as clearly shown in Fig. 6, and on these angle plates are located fire-brick slabs 65, which form the bottom of the combustion chamber of the barrel of the boiler. Secured to the bottom plate 64 are angle plates 66, which with the angle plates form a floor between the manifolds.

Projecting upwardly from the plates 64 to the outer manifolds 13b of the barrel of the boiler are plates 67, and at each side of the barrel is a fire brick lining 68, which is supported by the plate 67, and the outer tubes 53, in the present instance, rest against this fire brick lining.

At the fire box end of the boiler are plates 69, which extend from an angle plate 70 outside of the lower manifolds 34 to the upper manifolds 13, to which they are secured, as clearly shown in Figs. 3 and 4, and these plates are lined with fire brick 71. The plates 69 are curved as shown in Fig. 4 and are parallel with the outer pipes 35 of the series, and the fire brick lining 71 is held between these pipes and the plates 69.

The shell of the boiler is clearly shown in Fig. 8 and encloses the fire-box section and the barrel section of the boiler. It is made in sections 72, 73 and 74, in the present instance. Each section is flanged at 75, and extending between the flanges are the fire box casing sheet 11 and the sheets 8 and 12. 78 are longitudinal openings in each section of the casing. The openings are located on each side of the center line of the boiler as clearly shown in Figs. 3, 4 and 5. These openings are closed by doors 79 hinged to the casing at 80. The doors may be of any suitable construction. While the shell is shown as made in three sections, the number of sections may be varied.

The casing is enclosed with a non-conducting covering 81, held in place by plates 82, which are suitably secured to the casing plates 72, 73 and 74. Mounted on the upper surface of the drum 6 is a non-conducting covering 83 and at each longitudinal edge of this covering are angle plates 84.

Figure 9:
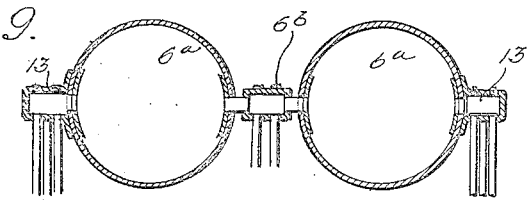
Fig. 9 is a view of a modification showing two longitudinal upper drums.

In Fig. 9 a modification is illustrated in which two longitudinal drums 6a are shown instead of the single drum shown in the main figures of the drawings. These drums are connected by central manifolds 6b and nipples, in the present instance, and at each side of the pair of drums are the manifolds 13, similar to the manifolds shown in Fig. 3.

It will be seen by the above description that I have designed a water tube boiler, the shell and fire box of which conforms to the standard flue tube locomotive boiler, so that it can be mounted on the standard locomotive frames and can be readily coupled to the auxiliary mechanisms of the locomotive. The outer shell also acts as a means for rigidly supporting the tubes of the boiler, which are attached to the manifolds of the upper drum and the lower transverse drums and manifolds by the ordinary method of expanding or rolling used in locomotive construction. That also may be fixed by the welding method if desired.

The lower ends of the tubes are accessible through plugged openings in the bottoms of the lower manifolds, which are exposed at the underside of the boiler. The upper ends of the tubes are accessible through plugged openings in the upper manifolds and these plugged openings are accessible through the openings 78 of the shell, which are closed by suitable doors. By constructing the boiler as described above, all the tubes by the fire box and in the barrel of the boiler are in the direct path of the products of combustion, passing through the boiler, so that high pressure steam can be readily produced. And by spacing the tubes in the manner shown in Fig. 6, sufficient room is provided for superheater tubes when a superheater is used. The outer casing is so designed that it will contain and properly support the entire steam generating system and will supply the necessary rigidity of structure for locomotive service. This consists of a fire box casing, a flue or barrel casing and a smoke box, all suitably joined to each other and to the main auxiliary drums. In constructing the casing the permanent end plates and certain intermediate plates which suport the main drums are extended below the casing to act as supports which are secured to the locomotive frame. These supports are either directly connected to the frame or by the medium of support castings intermediate between them and the frame itself.

By the above construction the use of stay-bolts is entirely dispensed with. The external casing allows the application of foot boards, hand rails and other legal requirements to be applied without modification from the conventional forms. This locomotive boiler gives maximum evaporative service by means of the water tubes so arranged as to be protected from shock and jarring by the outer casing, and allows for all usual expansion strains. The locomotive boiler casing is so arranged as to protect the pressure units of the boiler proper and to resist the damaging effects of local leaks or fractures within the casing. The sectional character of construction also lends itself to extensibility to suit various lengths of chasses without radical change in the design of the boiler as a whole. The design also provides settling reservoirs for material precipitated from the feed water, these reservoirs being preferably below the level of active circulation. This feature provides for cleanliness and efficiency in the evaporative units of the boiler.

I claim:

1. The combination in a locomotive boiler, of a casing enclosing a fire-box and the barrel of the boiler, and having at its forward end a smoke-box; a longitudinal upper drum extending throughout the length of the fire-box and barrel; a series of longitudinal manifolds at each side of the upper drum; a lower transverse drum at the rear of the fire-box and a pair of transverse drums at the forward end of the fire-box, one drum being mounted upon the other drum and communicating one with the other; longitudinal lower manifolds at each side of the fire-box; tubes at each side of the fire-box connecting the manifolds of the lower header with those of the upper header; transverse drums in the barrel of the boiler; longitudinal lower manifolds connecting the lower transverse drums and manifolds connecting the rear transverse drum of the barrel of the boiler with the upper transverse drum at the forward end of the fire-box; and a series of tubes connecting the lower manifolds with the upper manifolds.

2. The combination in a locomotive boiler, of a casing enclosing a fire-box and the barrel of the boiler, and having at its forward end a smoke-box; a longitudinal upper drum extending throughout the length of the fire-box and barrel; a series of longitudinal manifolds at each side of the upper drum; a lower transverse drum at the rear of the fire-box and a pair of transverse drums at the forward end of the fire-box, one drum being mounted upon the other drum and communicating one with the other; longitudinal lower manifolds at each side of the fire-box; tubes at each side of the fire-box connecting the manifolds of the lower header with those of the upper header; transverse drums in the barrel of the boiler; longitudinal lower manifolds connecting the lower transverse drums and manifolds connecting the rear transverse drum of the barrel of the boiler with the upper transverse drum at the forward end of the fire-box; and a series of tubes connecting the lower manifolds with the upper manifolds, some of these tubes being crossed under the upper drum and connected to lower manifolds at one side of the vertical center line of the boiler and connected to upper manifolds at the opposite side of said center line.

3. The combination in a locomotive boiler, of a casing enclosing a fire-box and the barrel of the boiler, and having at its forward end a smoke-box; a longitudinal upper drum extending throughout the length of the fire box and barrel; a series of longitudinal manifolds at each side of the upper drum; a lower transverse drum at the rear of the fire-box and a pair of transverse drums at the forward end of the fire-box, one drum being mounted upon the other drum and communicating one with the other; longitudinal lower manifolds at each side of the fire-box; tubes at each side of the fire-box connecting the manifolds of the lower header with those of the upper header; and transverse drums in the barrel of the boiler; longitudinal lower manifolds connecting the lower transverse drums and manifolds connecting the rear transverse drum of the barrel of the boiler with the upper transverse drum at the forward end of the fire-box; and a series of tubes connecting the lower manifolds with the upper manifolds, some of these tubes being crossed under the upper drum and connected to lower manifolds at one side of the center of the boiler and connected to upper manifolds at the opposite side of the center of the boiler; and tubes extending from the several transverse drums to the upper manifolds.

4. The combination in a locomotive boiler, of a casing enclosing a fire-box and the barrel of the boiler, and having at its forward end a smoke-box; a longitudinal upper drum extending throughout the length of the fire-box and barrel; a series of longitudinal manifolds at each side of the upper drum; a lower transverse drum at the rear of the fire-box and a pair of transverse drums at the forward end of the fire-box, one drum being mounted upon the other drum and communicating one with the other; longitudinal lower manifolds at each side of the fire-box connecting said transverse drums; tubes at each side of the fire-box connecting the said lower manifolds with those of the upper drum; and transverse drums in the barrel of the boiler; longitudinal lower manifolds connecting the lower transverse drums last named, and manifolds connecting the rear transverse drum of the barrel of the boiler with the upper transverse drum at the forward end of the fire-box; and a series of tubes connecting the lower manifolds with the upper manifolds, some of these tubes being crossed under the upper drum and connected to the lower manifolds at one side of the vertical center line of the boiler and connected to upper manifolds at the opposite side of said center line; and tubes extending from the several transverse drums to the upper manifolds, said tubes being crossed under the main drum of the boiler and extending from the transverse drums at one side of the boiler to the manifolds of the upper drum at the opposite side of the boiler.

5. The combination in a locomotive boiler, of a casing; a longitudinal upper drum extending through the length of the casing and over the fire-box; a manifold at each side of the upper drum at the fire-box; two manifolds at each side of the drum in the barrel of the boiler; a lower transverse drum at the rear and at the forward end of the fire-box; longitudinal manifolds connecting the two transverse drums, said manifolds being at the side of the fire-box; vertical tubes connecting the lower manifolds with the upper manifolds; lower transverse drums in the barrel of the boiler; longitudinal lower manifolds connecting the drums in the barrel of the boiler and also connected to the transverse drum at the forward end of the fire-box, the two upper manifolds being connected to the upper drum; and vertical tubes extending from the lower manifolds to the upper manifolds of the barrel of the boiler.

6. The combination in a locomotive boiler, of a casing; a longitudinal upper drum extending through the length of the casing and over the fire-box; a manifold at each side of the upper drum at the fire-box; two manifolds at each side of the drum in the barrel of the boiler; a lower transverse drum at the rear and at the forward end of the fire-box; longitudinal manifolds connecting the two transverse drums, said manifolds being at the side of the fire-box; vertical tubes connecting the lower manifolds with the upper manifolds; lower transverse drums in the barrel of the boiler; longitudinal lower manifolds connecting the drums in the barrel of the boiler and also connected to the transverse drum at the forward end of the fire-box, the two upper manifolds being connected to the upper drum; vertical tubes extending from the lower manifolds to the upper manifolds of the barrel of the boiler; and tubes extending from the lower transverse drums and to the upper longitudinal drum.

7. The combination in a locomotive boiler, of a casing; a longitudinal upper drum extending through the length of the casing and over the fire-box; a manifold at each side of the upper drum at the fire-box; two manifolds at each side of the drum in the barrel of the boiler; a lower transverse drum at the rear and at the forward end of the fire-box; longitudinal manifolds connecting the two transverse drums, said manifolds being at the side of the fire-box; vertical tubes connecting the lower manifolds with the upper manifolds; lower transverse drums in the barrel of the boiler; longitudinal lower manifolds connecting the drums in the barrel of the boiler and also connected to the transverse drum at the forward end of the fire-box, the two upper manifolds being connected to the upper drum; vertical tubes extending from the lower manifolds to the upper manifolds of the barrel of the boiler; tubes extending from the lower transverse drums and to the upper longitudinal drum; and tubes at each side of the barrel section of the boiler connecting the lower transverse drums and the longitudinal manifolds of the upper drum.

8. The combination in a water tube locomotive boiler, of a casing; a longitudinal drum in the upper portion of the boiler; a manifold on each side of the drum and communicating therewith above the fire-box of the boiler; a lower transverse drum at the rear end of the fire-box and two transverse drums at the forward end of the fire-box; nipples connecting said upper and lower transverse drums; a lower longitudinal manifold connecting the rear drum with the lower drum at the forward end of the fire-box; tubes connected to the lower manifolds and to the upper manifolds and located at each side of the fire-box; and reinforcing castings shaped to partly encircle both drums at the forward end of the fire-box.

9. The combination in a water tube locomotive boiler, of a casing; a longitudinal drum in the upper portion of the boiler; a manifold on each side of the drum and communicating therewith above the fire-box of the boiler; a lower transverse drum at the rear end of the fire-box and two transverse drums at the forward end of the fire-box; nipples connecting said upper and lower transverse drums; a lower longitudinal manifold connecting the rear drum with the lower drum at the forward end of the fire-box; tubes connected to the lower manifolds and to the upper manifolds and located at each side of the fire-box; and reinforcing castings shaped to partly encircle both drums at the forward end of the fire-box; and diagonal tubes extending from the upper drum at the forward end of the fire-box to the lower end of the upper drum near the rear end of the fire-box.

10. The combination in a water tube locomotive boiler, of a casing; a longitudinal drum in the upper portion of the boiler; a manifold on each side of the drum and communicating therewith above the fire-box of the boiler; a lower transverse drum at the rear end of the fire-box and two lower transverse drums at the forward end of the fire-box superimposed one above the other; nipples connecting said superimposed transverse drums; lower longitudinal manifolds connecting the said rear-end drum with the lower transverse drum at the forward end of the fire-box; tubes connected to the lower manifolds and to the upper manifolds and located at each side of the fire-box; reinforcing castings shaped to partly encircle both of the said transverse drums at the forward end of the fire-box; diagonal tubes extending from the upper transverse drum at the forward end of the fire-box to the bottom of the upper drum near the rear end of the fire-box; and tubes extending from the upper transverse drum to the manifolds of the upper longitudinal drum.

11. The combination in a water tube locomotive boiler, of a casing; a longitudinal drum in the upper portion of the boiler; a manifold on each side of the drum and communicating therewith above the fire-box of the boiler; a lower transverse drum at the rear end of the fire-box and two lower transverse drums at the forward end of the fire-box superimposed one above the other; nipples connecting said upper and lower transverse drums; lower longitudinal manifolds connecting the lower rear drum with the nether of the two drums at the forward end of the fire-box; tubes connected to the lower manifolds and to the upper manifolds and located at each side of the fire-box; reinforcing castings shaped to partly encircle both the transverse drums at the forward end of the fire-box; diagonal tubes extending from the upper transverse drum at the forward end of the fire-box to the bottom of the upper longitudinal drum at a point near the rear end of the fire-box; and tubes extending from the upper transverse drum to the manifolds of the upper longitudinal drum, some of said tubes connecting directly with the upper manifolds at the same side of the boiler, while other tubes cross each other and extend under the upper longitudinal drum and to the manifold at the opposite side.

12. The combination in a locomotive boiler, of a casing enclosing a fire-box and barrel of a boiler; an upper longitudinal drum; a manifold at each side of the drum and connected therewith; lower transverse drums; lower longitudinal manifolds connecting the lower drums; tubes extending from the lower manifolds to the upper manifolds; plates extending between the upper and lower manifolds and spaced from the tubes, fire-brick lining located between the tubes and the plates; an outer casing enclosing the entire inner structure, and baffle plates extending between the outer casing and said upper manifolds.

13. The combination in a water tube locomotive boiler having a fire-box and a barrel extending from the fire-box; drums and tubes in said boiler; vertical division plates separating the boiler into sections, said plate having openings therein for the passage of the products of combustion, said plates extending beyond the drums; a casing enclosing the tubes and drums; and a casing surrounding the tubes and upper drum, said casing being made in sections and secured to the projecting portions of the division plates.

14. The combination in a water tube locomotive boiler having a fire-box and barrel, of a longitudinal drum in the upper portion of the barrel; a series of transverse drums in the lower portion of the boiler; longitudinal lower manifolds connecting the several lower drums; tubes extending from the drums and manifolds to the upper drum; inner casing plates at each side of the boiler and fire brick lining for said plates; a series of vertical division plates spaced apart and extending to the outside of the boiler structure, said division plates supporting the boiler structure on the frame of the locomotive; and an outer casing made in sections, each section of the outer casing being secured to said vertical division plates, said division plates having enlarged openings therein for the passage of the products of combustion through the boiler.

WILLIAM A. AUSTIN.